US011255318B2

(12) United States Patent
Gibson et al.

(10) Patent No.: US 11,255,318 B2
(45) Date of Patent: Feb. 22, 2022

(54) ELECTRIC CONTROL MODULE SOLENOID PUMP

(71) Applicant: Motor Components, LLC, Elmira Heights, NY (US)

(72) Inventors: Matthew J. Gibson, Elmira, NY (US); Benjamin H. Evans, Hammondsport, NY (US); Michael Robert DePue, Greene, NY (US)

(73) Assignee: Motor Components, LLC, Elmira Heights, NY (US)

( * ) Notice: Subject to any disclaimer, the term of this patent is extended or adjusted under 35 U.S.C. 154(b) by 206 days.

(21) Appl. No.: 16/140,828

(22) Filed: Sep. 25, 2018

(65) Prior Publication Data

US 2019/0145393 A1 May 16, 2019

Related U.S. Application Data

(60) Provisional application No. 62/584,207, filed on Nov. 10, 2017.

(51) Int. Cl.
| | |
|---|---|
| *F04B 17/04* | (2006.01) |
| *F04B 49/10* | (2006.01) |
| *F04B 49/06* | (2006.01) |
| *F04B 35/04* | (2006.01) |
| *F04B 49/03* | (2006.01) |
| *H02P 25/06* | (2016.01) |

(52) U.S. Cl.
CPC .......... *F04B 17/046* (2013.01); *F04B 35/045* (2013.01); *F04B 49/03* (2013.01); *F04B 49/065* (2013.01); *F04B 49/10* (2013.01); *F04B 2203/04* (2013.01); *F04B 2203/0402* (2013.01); *F04B 2203/0404* (2013.01); *F04B 2207/043* (2013.01); *H02P 25/06* (2013.01)

(58) Field of Classification Search
None
See application file for complete search history.

(56) References Cited

U.S. PATENT DOCUMENTS

| | | |
|---|---|---|
| 3,134,938 A | 5/1964 | Morgan |
| 3,400,663 A | 9/1968 | Wertheimer |
| 3,556,684 A | 1/1971 | Rouquette |

(Continued)

*Primary Examiner* — Essama Omgba
*Assistant Examiner* — Geoffrey S Lee
(74) *Attorney, Agent, or Firm* — Simpson & Simpson, PLLC; Michael Nicholas Vranjes (57) ABSTRACT

A control unit for a solenoid pump, the solenoid pump including: an inlet port, an outlet port, and a first through-bore connecting the inlet and outlet ports; a plunger disposed within the first through-bore and including a second through-bore; a spring arranged to urge the plunger toward the outlet port; a solenoid coil disposed about a portion of the plunger and arranged to displace the plunger toward the inlet port in response to direct current coil power applied to the solenoid coil, the control unit including a microcontroller operatively arranged to control the solenoid coil, a first transistor operatively arranged to receive an external signal and communicate the signal to the microcontroller to control the solenoid coil, and a second transistor, arranged between the microcontroller and the solenoid coil, the second transistor operatively arranged to energize and de-energize the solenoid coil in response to the microcontroller.

20 Claims, 6 Drawing Sheets

(56) References Cited

U.S. PATENT DOCUMENTS

| | | | |
|---|---|---|---|
| 3,742,256 A | 6/1973 | Frederiksen et al. | |
| 3,849,031 A | 11/1974 | Charboneau et al. | |
| 3,864,618 A | 2/1975 | Hammond | |
| 4,047,852 A | 9/1977 | O'Connor et al. | |
| 5,085,563 A | 2/1992 | Collins et al. | |
| 5,924,975 A | 7/1999 | Goldowsky | |
| 6,877,326 B2* | 4/2005 | Kim | F04B 35/045 62/230 |
| 7,124,741 B2* | 10/2006 | Cagnoni | F02D 41/221 123/472 |
| 7,942,133 B2 | 5/2011 | Alessandr et al. | |
| 8,988,025 B2* | 3/2015 | Calnek | F04B 17/03 318/400.21 |
| 9,500,190 B2* | 11/2016 | Moreira-Espinoza | F04B 17/046 |
| 9,890,778 B2* | 2/2018 | Kusumba | F04B 51/00 |
| 10,436,191 B2* | 10/2019 | Ryu | F25B 49/022 |
| 2002/0064463 A1 | 5/2002 | Park et al. | |
| 2003/0021693 A1 | 1/2003 | Schwarz et al. | |
| 2003/0175125 A1 | 9/2003 | Kwon et al. | |
| 2003/0177773 A1* | 9/2003 | Kim | F25D 21/002 62/156 |
| 2005/0140351 A1* | 6/2005 | Cagnoni | F02D 41/20 323/323 |
| 2007/0152512 A1 | 7/2007 | Tian et al. | |
| 2007/0256428 A1* | 11/2007 | Unger | H02K 11/33 62/6 |
| 2007/0276544 A1 | 11/2007 | Dainez et al. | |
| 2010/0037644 A1 | 2/2010 | Ward | |
| 2012/0265359 A1* | 10/2012 | Das | H04L 12/40032 700/292 |
| 2013/0028753 A1* | 1/2013 | Moreira-Espinoza | F04B 17/046 417/53 |
| 2013/0187584 A1* | 7/2013 | Calnek | F04B 17/03 318/400.21 |
| 2014/0005844 A1* | 1/2014 | Newcomb | F02G 5/00 700/287 |
| 2017/0122309 A1* | 5/2017 | Kusumba | F04B 53/14 |
| 2017/0152846 A1* | 6/2017 | Ryu | F25B 49/022 |

* cited by examiner

Fig. 5 ial Application No. 62/584,207, filed
ELECTRIC CONTROL MODULE SOLENOID PUMP

CROSS-REFERENCE TO RELATED APPLICATIONS

This application claims the benefit under 35 U.S.C. § 119(e) of U.S. Provisional Application No. 62/584,207, filed Nov. 10, 2017, which application is incorporated herein by reference in its entirety.

FIELD

The present disclosure relates to an electronic control module pump, and more particularly, to an electronic control module pump having an externally controlled circuit.

BACKGROUND

Known solenoid pumps use linear springs to bias a plunger against displacement by a solenoid coil in a pumping cycle. When the springs are fully compressed, the springs occupy an undesirably large space since the coils for the springs stack upon each other. Known control schemes for solenoid pumps use a fixed duty cycle, typically 50, regardless of the magnitude of the input voltage to be used to energize the solenoid coils for the pumps. As a result, too little power is delivered to the coils for low values of the input voltage and the coils remain energized even after plungers for the pumps have fully displaced to fully compress the springs for the pumps. As a result, the pumps consume unnecessarily high amounts of energy and undesirable amounts of heat are generated, which degrades operation of the pumps.

Known electronic control module pumps use internally located timer chips to generate the pulse drive to the output stage of the pump. Pump pulse on and off times are automatically generated by the timer chip. Unless there is a failure of the timer chip, the pump pulse will always be within the specified safe area range of the output stage. However, current electronic control module pumps do not allow for external sources to control the pump pulses.

Thus, there is a long felt need for a control unit that allows a signal source that is external to the control unit and solenoid pump to energize/de-energize the solenoid coil, while maintaining safe solenoid pump operating times.

SUMMARY

According to aspects illustrated herein, there is provided a control unit for a solenoid pump, the solenoid pump including an inlet port, an outlet port, and a first through-bore connecting the inlet and outlet ports, a plunger disposed within the first through-bore and including a second through-bore, a spring arranged to urge the plunger toward the outlet port, a solenoid coil disposed about a portion of the plunger and arranged to displace the plunger toward the inlet port in response to direct current coil power applied to the solenoid coil, the control unit comprising a microcontroller operatively arranged to control the solenoid coil, a first transistor, arranged between the microcontroller and the solenoid coil, the first transistor operatively arranged to energize and de-energize the solenoid coil in response to the microcontroller, and a second transistor operatively arranged to receive an external signal and communicate the signal to the microcontroller to control the solenoid coil.

According to aspects illustrated herein, there is provided a solenoid pump, including an inlet port, an outlet port, and a first through-bore connecting the inlet and outlet ports, a plunger disposed within the first through-bore and including a second through-bore, a spring arranged to urge the plunger toward the outlet port, a solenoid coil disposed about a portion of the plunger and arranged to displace the plunger toward the inlet port in response to direct current coil power applied to the solenoid coil, and a control unit including a power header electrically connected to the solenoid coil, a first transistor electrically connected to the solenoid coil, a microcontroller electrically connected to the first transistor, a second transistor electrically arranged between the microcontroller and the power header, and an external signal source electrically connected to the second transistor.

According to aspects illustrated herein, there is provided a control unit for a solenoid pump, the solenoid pump including: an inlet port, an outlet port, and a first through-bore connecting the inlet and outlet ports, a plunger disposed within the first through-bore and including a second through-bore; a spring arranged to urge the plunger toward the outlet port, a solenoid coil disposed about a portion of the plunger and arranged to displace the plunger toward the inlet port in response to direct current coil power applied to the solenoid coil, the control unit comprising a power header electrically connected to the solenoid coil, a first transistor electrically connected to the solenoid coil, a microcontroller electrically connected to the first transistor, a second transistor electrically arranged between the microcontroller and the power header, and an external signal source electrically connected to the second transistor.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
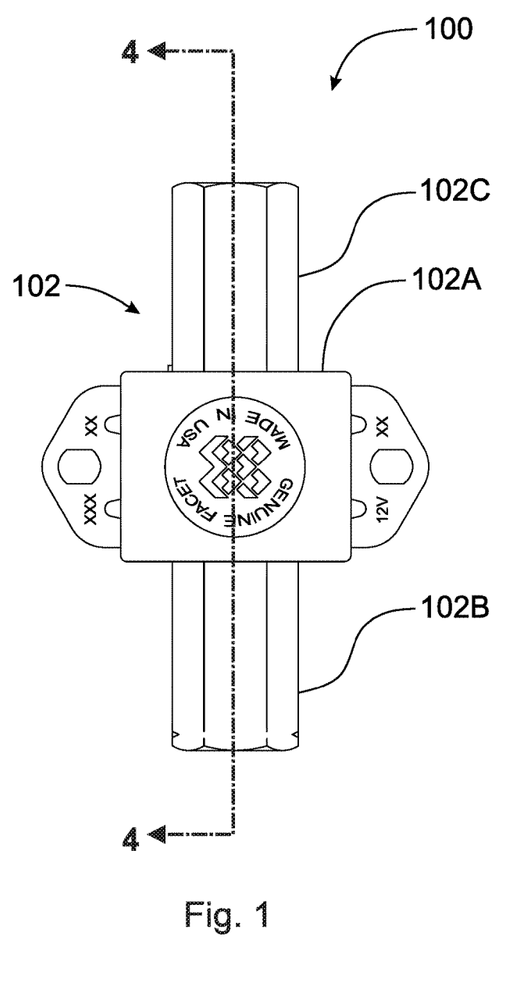
FIG. 1 is a top elevational view of an electronic control module pump.
Figure 2:
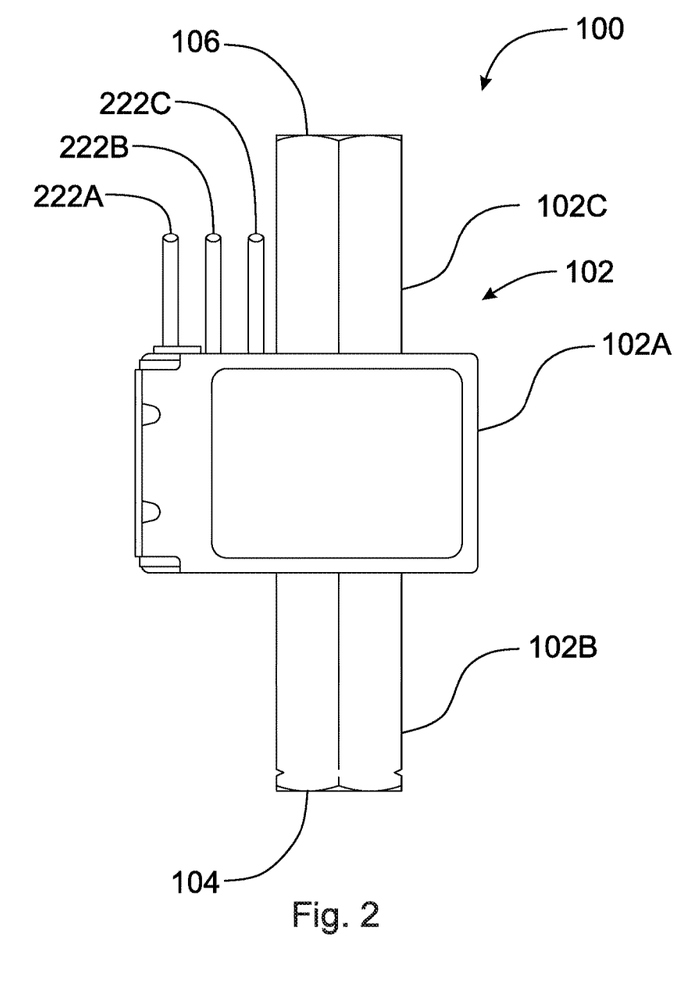
FIG. 2 is a side elevational view of the electronic control module pump shown in FIG. 1.

Adverting now to the figures, FIG. 1 is a top elevational view of electronic control module pump 100. FIG. 2 is a side elevational view of electronic control module pump 100 shown in FIG. 1. Electronic control module pump 100 comprises housing 102 having inlet port 104 and outlet port 106. In some embodiments, housing 102 comprises main housing 102A, inlet housing 102B, and outlet housing 102C. Inlet housing 102B and outlet housing 102C are connected to main housing 102A by any means known in the art, for example, threads and adhesives. Electronic control module pump 100 further comprises power input line 222A, signal input line 222B, and ground line 222C. In some embodiments, power input line 222A, signal input line 222B, and ground line 222C are connected to electronic control module pump 100 through main housing 102A. Electronic control module pump 100 may be, for example, a high pressure solenoid pump or any other suitable pump. In some embodiments, electronic control module pump 100 is controlled using pulse width modulation.

Figure 3:
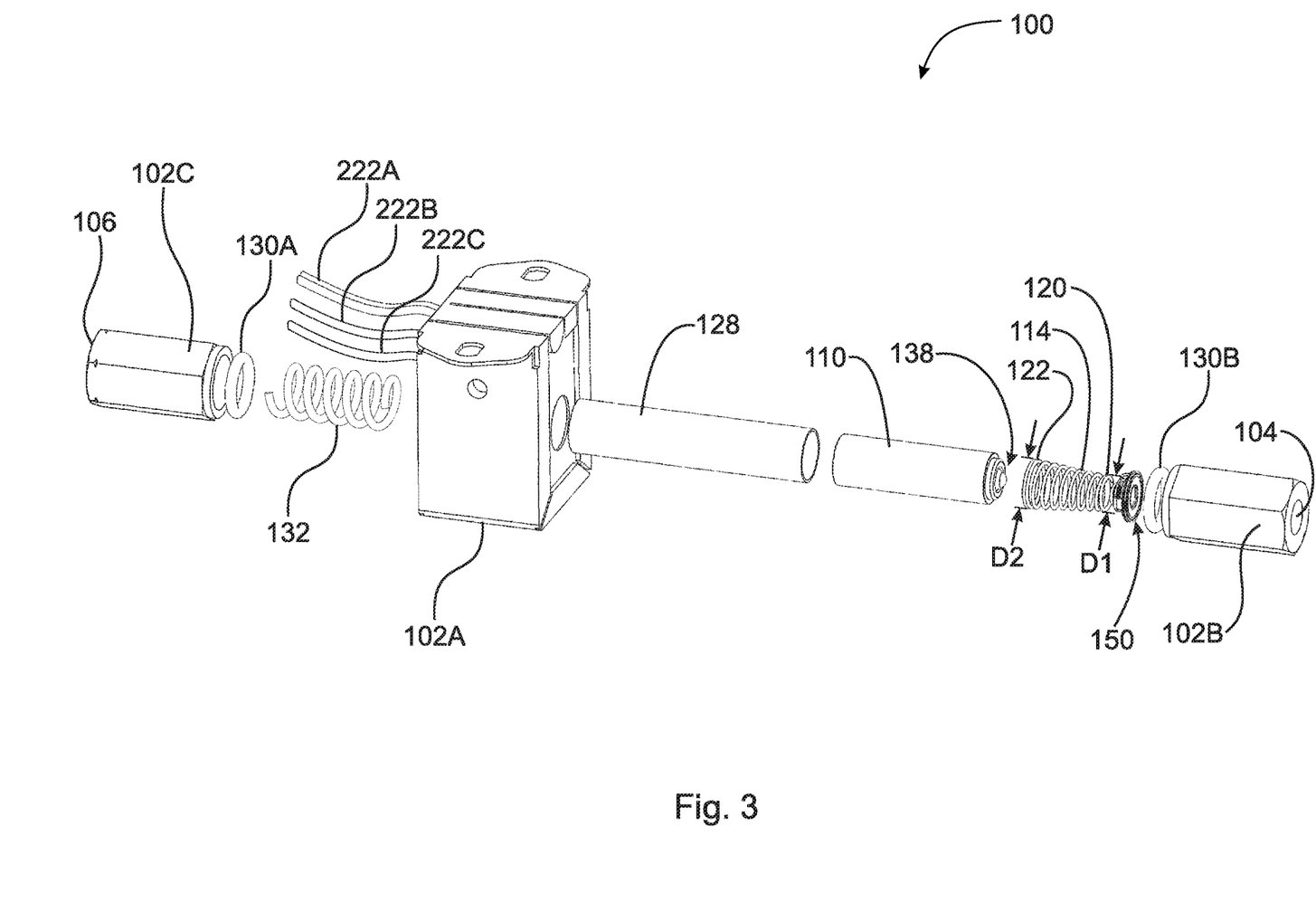
FIG. 3 is an exploded view of the electronic control module pump shown in FIG. 1.

FIG. 3 is an exploded view of electronic control module pump 100. As shown in FIG. 3, electronic control module pump 100 further comprises, from left to right, seal 130A, bumper spring 132, sleeve 128, plunger 110, suction valve assembly 138, spring 114, one-way check valve 150, and seal 130B.

Figure 4A:
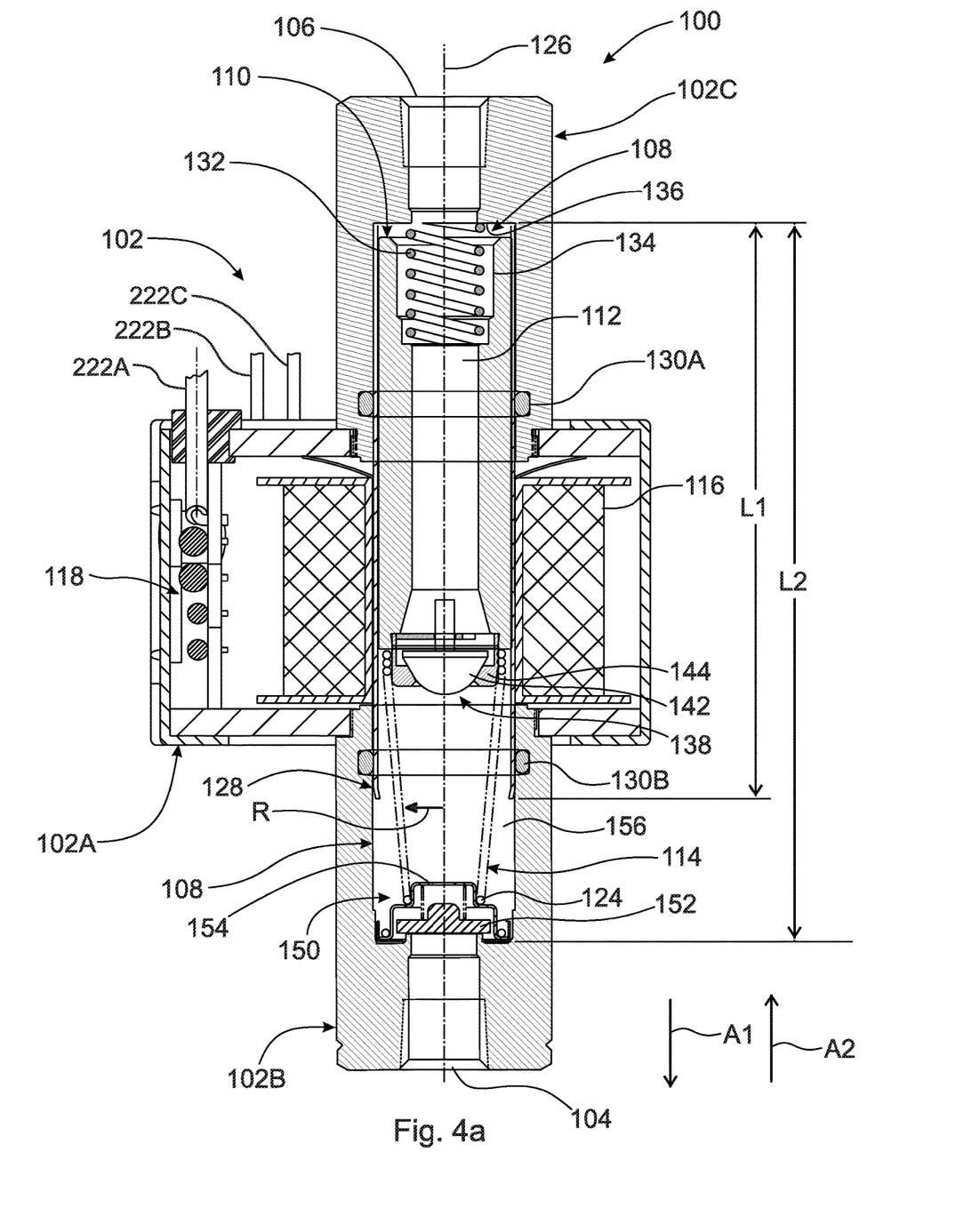
FIG. 4A is a cross-sectional view of the electronic control module pump taken generally along line 4-4 in FIG. 1, in a rest position.
Figure 4B:
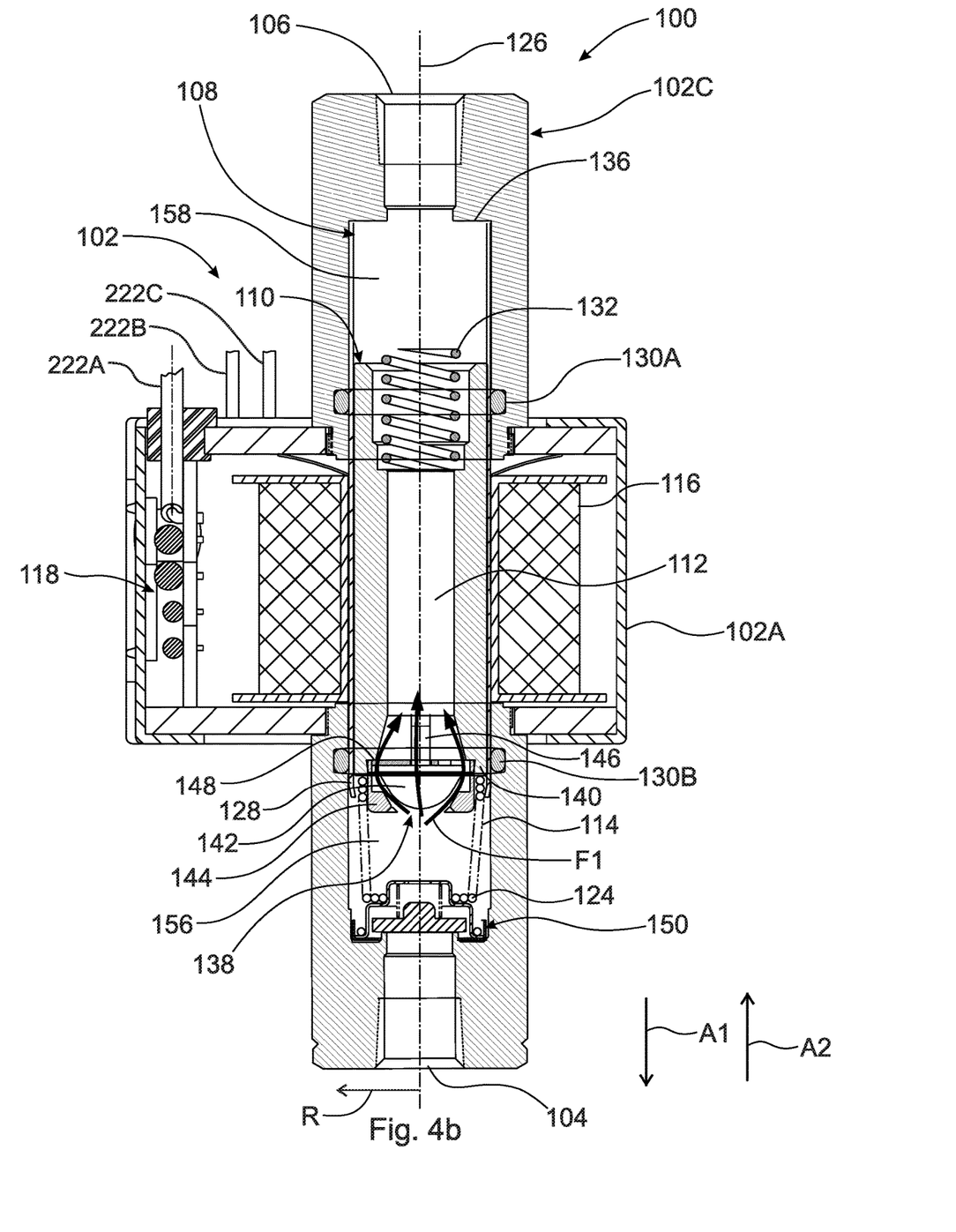
FIG. 4B is a cross-sectional view of the electronic control module pump taken generally along line 4-4 in FIG. 1, in an energized position.
Figure 4C:
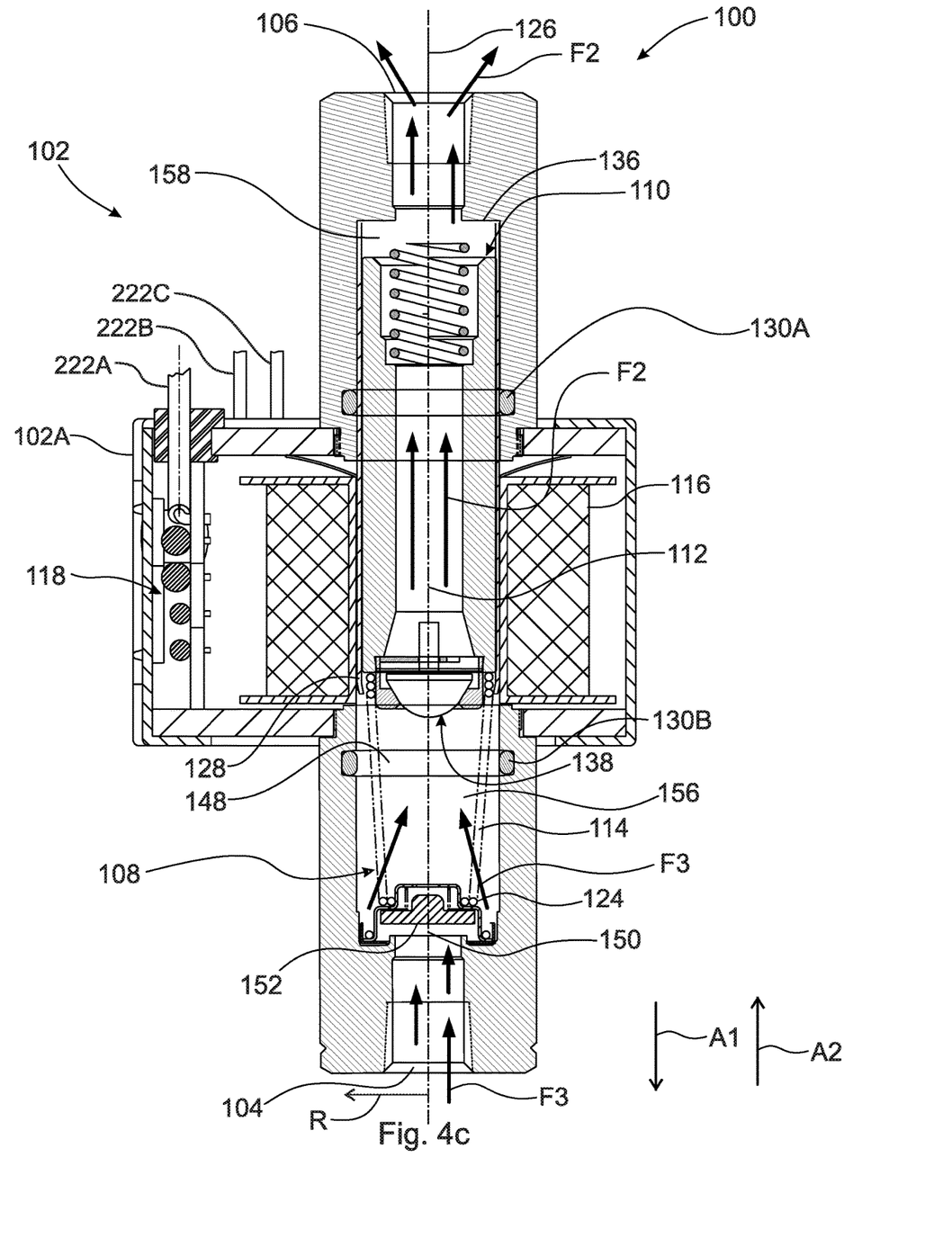
FIG. 4C is a cross-sectional view of the electronic control module pump taken generally along line 4-4 in FIG. 1, in a de-energized position; and, FIG. 5 depicts an exemplary power circuit for a control scheme for energizing/de-energizing solenoid coil according to external signals.

FIGS. 4A-4C are respective cross-sectional views of electronic control module pump 100 taken generally along line 4-4 in FIG. 1, depicting various stages of a pumping cycle. The following should be viewed in light of FIGS. 1 through 4C. Electronic control module pump 100 comprises through-bore 108, plunger 110, solenoid coil 116, and control unit 118. In some embodiments, electronic control module pump 100 may comprise one or more solenoid coils. Through-bore 108 connects inlet port 104 and outlet port 106. Plunger 110 is disposed within through-bore 108 and includes through-bore 112. Spring 114 is arranged in electronic control module pump 100 to urge plunger 110 toward outlet port 106. Solenoid coil 116 is arranged in electronic control module pump 100, specifically within main housing 102A, to displace plunger 110 toward inlet port 104 in response to power being applied to solenoid coil 116. Control unit 118 is arranged within electronic control module pump 100, specifically within main housing 102A, for controlling the operation of solenoid coil 116.

Spring 114 is a variable rate spring. By "variable rate spring" it is meant that the force of spring 114 increases as spring 114 is compressed in direction A1 toward inlet port 104, for example, by plunger 110. Stated otherwise, referring to Hooke's Law: $F=-kx$, the constant k for the spring increases as the spring is compressed. Thus, the further the spring is compressed, the more force is needed to continue compressing the spring. For example, when plunger 110 begins displacing in direction A1 from the position shown in FIG. 4A, a certain amount of force is required to compress spring 114. As plunger 110 continues to displace to the position shown in FIG. 4B, an increasingly greater amount of force is required to continue compressing spring 114. The rate for spring 114 may vary according to pump type and the pressure output of the pump, and the spring characteristics may be varied accordingly, for example k for the spring.

Spring 114 has a frusto-conical shape, for example, diameter D1 at end 120 of spring 114 is less than diameter D2 at end 122 of spring 114, opposite end 120 (as shown in FIG. 3). Thus, when spring 114 is compressed as shown in FIG. 4B, compressed coils 124 of spring 114 are aligned in direction R orthogonal to longitudinal axis 126, which passes through inlet port 104 and outlet port 106. In some embodiments, spring 114 is cylindrical in shape.

Sleeve 128 is arranged within bore 108 and displaceable parallel to longitudinal axis 126. Plunger 110 is arranged within sleeve 128 and is displaceable therein parallel to longitudinal axis. Seals 130A and 130B are arranged to provide a seal between housing 102 and sleeve 128, while enabling movement of sleeve 128 within bore 108. Seals 130A and 130B may be any suitable seal, such as O-rings. Sleeve 128 has length L1, which is less than length L2 of bore 108 and allows sleeve 128 to "float" within bore 108. Advantageously, this floating design increases the ease of fabrication of electronic control module pump 100, since fabrication steps that would be needed to fix sleeve 128 within electronic control module pump 100 are eliminated. Further, this floating design enables greater flexibility since sleeves of different lengths can be easily installed. Also, since length L1 is less than length L2, tolerances for length L1 can be relaxed, reducing manufacturing cost and complexity. In some embodiments, sleeve 128 is made from a non-magnetic material.

In some embodiments, plunger 110 is arranged to pass fluid through through-bore 112 and longitudinally traverses electronic control module pump 110 between inlet port 104 and outlet port 106. In some embodiments, bumper spring 132 is disposed in end 134 of plunger 110. Bumper spring 132 contacts shoulder 136 in housing 102 to cushion the impact of plunger 110 as plunger 110 moves from the position of FIG. 4B to the position of FIG. 4A. Sleeve 128 serves as the primary location wherein mechanical pumping operations are performed. Suction valve assembly 138 is disposed at end 140 of plunger 110. In some embodiments, suction valve assembly 138 comprises cap 142, seat 144, and stem 146, which passes through retainer element 148. The operation of the suction valve assembly is described in greater detail below.

Electronic control module pump 100 further comprises one-way check valve 150. One-way check valve 150 enables fluid flow through inlet port 104 toward outlet port 106 in direction A2, and blocks fluid flow in direction A1, opposite direction A2. In some embodiments, one-way check valve 150 comprises valve housing 154 and sealing element 152, which is arranged within valve housing 154. Sealing element 152 seals against the housing, for example, inlet housing 102B blocks fluid from flowing out of electronic control module pump 100 through inlet port 104. For example, one-way check valve 150 is arranged to draw fuel from a fuel source such as a fuel tank.

FIG. 4A is a cross-sectional view of electronic control module pump 100 taken generally along line 4-4 in FIG. 1, in a rest position. FIG. 4A shows plunger 110, suction valve assembly 138, one-way check valve 150, and spring 114 in respective rest positions. While solenoid coil 116 is not energized, spring 114 biases, or urges, plunger 110 in direction A2 such that bumper spring 132 is in contact with shoulder 136. If backpressure exists, i.e., pressure caused by fluid entering from outlet port 106, cap 142 forms a seal with seat 144 to prevent fluid from flowing from bore 112 past suction valve assembly 138 in direction A1. Sealing element 152 prevents fluid from flowing past one-way check valve 150 in direction A1 and out through inlet port 104.

FIG. 4B is a cross-sectional view of electronic control module pump 100 taken generally along line 4-4 in FIG. 1, in an energized position. In FIG. 4B, solenoid coil 116 is energized thereby forming a magnetic field. The magnetic field created by the energized solenoid coil 116 imparts a directional force upon plunger 110 in direction A1 toward inlet port 104. This directional force causes plunger 110 to displace in direction A1 and spring 114 to compress. As a result of the movement in direction A1 and the configuration of suction valve assembly 138, a negative pressure, or suction, is formed in chamber 158 of bore 108 and bore 112, displacing cap 142 from seat 144. Fluid present in chamber 156 just prior to energizing coil 116 is sucked around suction valve assembly 138, as shown by flow lines F1, and into bore 112 and chamber 158. During this stage, fluid is prevented from moving between chamber 156 and inlet port 102 by one-way check valve 150.

FIG. 4C is a cross-sectional view of electronic control module pump 100 taken generally along line 4-4 in FIG. 1, in a de-energized position. As solenoid coil 116 is de-energized, the magnetic field collapses. As a result, plunger 110 is no longer acted upon by a magnetic force and is urged in direction A2 toward the rest location of FIG. 4A by the bias of spring 114. Two simultaneous events occur during the movement of plunger 110 in direction A2. First, fluid contained in bore 112 and chamber 158 is forced out of outlet port 104, as shown by fluid flow lines F2. The fluid in bore 112 and chamber 158 is prevented from entering chamber 156 by the seal created between cap 142 and seat 144. Second, and simultaneously, fluid is replenished in chamber 156 as follows. As plunger 110 moves in direction A2, a negative pressure, or suction, is created in chamber 156. The negative pressure causes one-way check valve 150 to open, allowing fluid to be drawn from inlet port 102 into chamber 156, as shown by fluid flow lines F3. The operation described above regarding FIGS. 4A-4C is cyclically repeated during the use of electronic control module pump 100.

As noted above, some amount of back pressure, that is, pressure exerted through outlet port 106 into bore 108 in direction A1, is typically present during operation of electronic control module pump 100. The back pressure biases plunger 110 in direction A1, against the biasing of spring 114. When the force of the back pressure is greater than the force exerted by spring 114, for example, spring 114 no longer can urge plunger 110 in direction A2 from the position in FIG. 4B, the reciprocating action of plunger 110 is terminated, and fluid no longer can be transferred as described above. Known solenoid pumps using nominal 12 VDC input power cannot operate (pump fluid) above about 10 psi of back pressure.

Advantageously, electronic control module pump 100 is able to operate (pump fluid) up to about 15 psi of back pressure. The ability of electronic control module pump 100 to operate at greater back pressures is at least partly due to the variable rate of spring 114. Due to the characteristics associated with operation of solenoid coil 116, it is desirable to minimize the amount of resistance plunger 110 must overcome at the onset of a cycle. As noted above, the variable rate results in spring 114 advantageously generating relatively less biasing force resisting movement of plunger 110 in direction A1 at the onset of a pump cycle, for example, starting in the position of FIG. 4A. Also as noted above, the biasing force of spring 114 increases as spring 114 is compressed, such that in the position shown in FIG. 4B, the biasing force is maximized. This maximized force initiates the movement of plunger 110 in direction A2 after solenoid coil 116 is de-energized. Advantageously, the biasing force generated by spring 114 when solenoid coil 116 is de-energized determines the amount of back pressure under which electronic control module pump 100 can operate. That is, the greatest amount of biasing force from spring 114 is needed to initiate displacement of plunger 110 against the back pressure when solenoid coil 116 is de-energized. Thus, spring 114 provides the least resistance when less resistance is advantageous, that is, when solenoid coil 116 is first energized and the displacement of plunger 110 in direction A1 begins. Spring 114 provides the most resistance when more resistance is advantageous, that is, when solenoid coil 116 is de-energized and spring 114 must operate against the back pressure.

Electronic control module pump 100 can be used in common rail systems. As noted above, in a common rail system a relatively low pressure pump is used to pump fuel from a fuel source to a high pressure pump. For a common rail system, the back pressure on the outlet port of the low pressure pump is greater than the 10 psi maximum back-pressure under which known solenoid pumps can operate. Advantageously, the approximately 15 psi maximum back-pressure under which pump 100 can operate is sufficient to enable operation of pump 100 in a common rail system. It should be appreciated, however, that electronic control module pump 100 can be used in any low pressure pumping system and that the present disclosure should not be limited to only common rail systems.

Electronic control module pump 100 is referenced in the discussion that follows; however, it should be understood that the control scheme described below is applicable to any solenoid pump using a solenoid coil to displace an element to transfer fluid from an inlet port for the pump to an outlet port for the pump. Control unit 118 is arranged to control the operation of the solenoid coil. Control unit 118 is arranged to accept input voltage V, for example, from an outside source, such as a battery of a vehicle in which the pump is installed. It should be understood that any source of direct current electricity known in the art can be used to provide input voltage V. A continuous input voltage V is provided to control unit 118, specifically to externally controlled circuit 220, via power input line 222A. Electronic control module pump 100 is grounded via ground line 222C. Ground line 222C is the direct physical connection of externally controlled circuit 220 to earth. Control unit 118 is also arranged to accept a signal S. In some embodiments, signal S is provided to control unit 118, specifically to externally controlled circuit 220, via signal input line 222B. It should be appreciated that signal S may be provided to control unit 118 via wireless communication, in which case externally controlled circuit 220 would have a wireless communication receiver.

Figure 5:
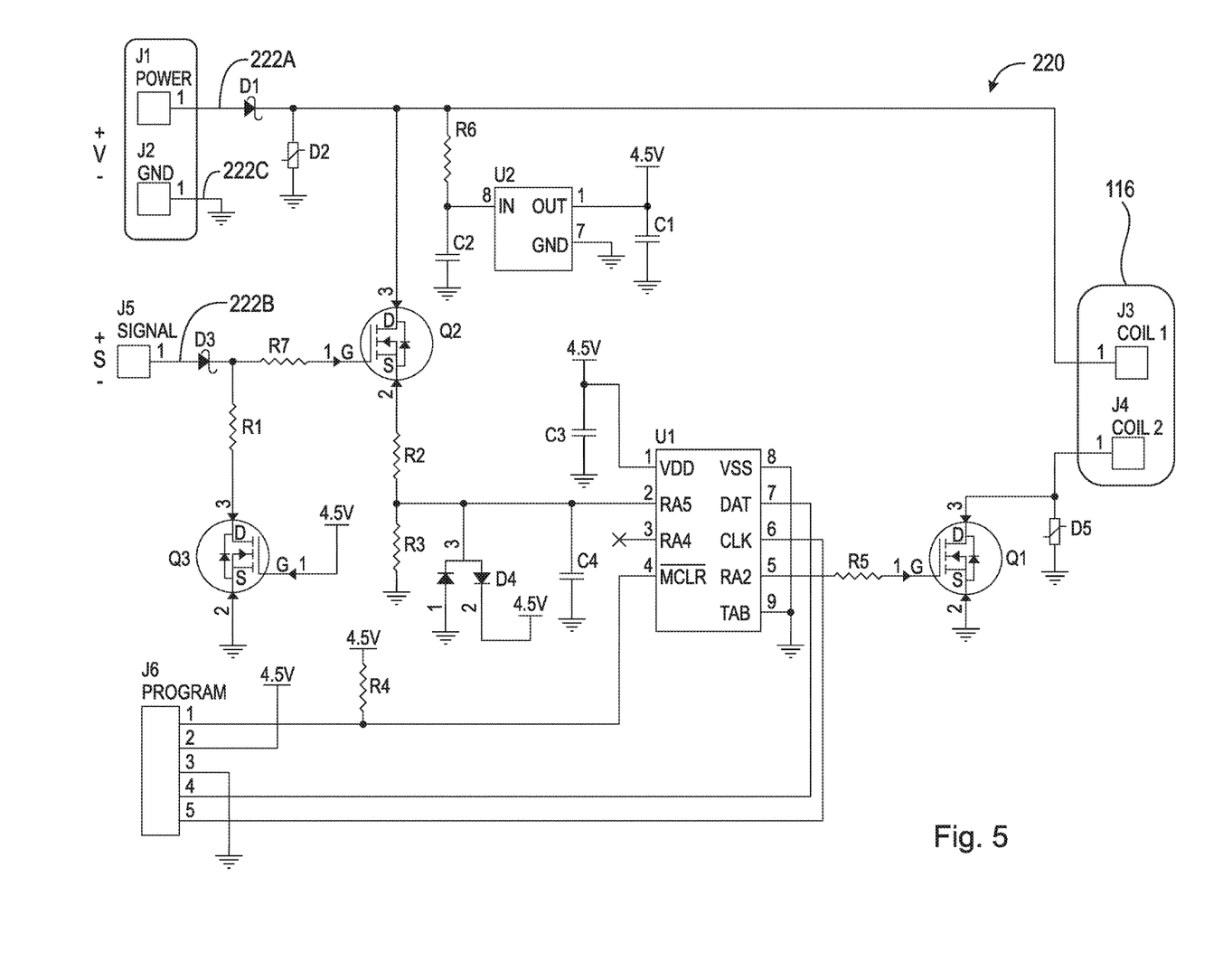

FIG. 5 depicts externally controlled circuit 220 for a control scheme for energizing/de-energizing solenoid coil 116 according to external signals. The following should be viewed in light of FIGS. 4A through 5. Electronic control module pump 100 is used as an example in the discussion that follows. However, it should be understood that the control scheme described below is applicable to any pump using a solenoid coil to displace an element to transfer fluid from an inlet port for the pump to an outlet port for the pump and is not limited to electronic control module pump 100. In some embodiments, control unit 118 includes externally controlled circuit 220 shown in FIG. 5. Although externally controlled circuit 220 is described with respect to control unit 118, it should be understood that externally controlled circuit 220 is applicable to any pump using a solenoid coil to displace an element to transfer fluid from an inlet port for the pump to an outlet port for the pump and is not limited to control unit 118.

As shown, externally controlled circuit 220 generally comprises power input line 222A, signal input line 222B, and ground line 222C. Input voltage V is continuously provided to externally controlled circuit 220, specifically to solenoid coil 116. Externally controlled circuit 220 further comprises microcontroller U1. Microcontroller U1 may be, for example, a PIC12F752-E/MF microcontroller manufactured by Microchip Technology. Microcontroller U1 is programmable and operates to energize and de-energize solenoid coil 116 in response to signal S.

In some embodiments, externally controlled circuit 220 comprises the following: Power header J1 is connected to power input line 222A. Ground header J2 is connected to ground line 222C. Diode D1 provides reverse polarity protection to ensure that nothing will happen if a negative voltage is applied to the power header J1. Diode D1 may be, for example, a SSC54-E3/57T diode manufactured by Vishay Semiconductor Diodes Division. D2 is a transient voltage suppressor (TVS). In some embodiments, diode D2 may be a transient voltage suppression diode that is simply a Zener diode designed to protect electronics device against overvoltages. In some embodiments, diode D2 comprises metal-oxide varistors (MOV) that protect electronic circuits and electrical equipment. Diode D2 may be, for example, a SMCJ24A diode manufactured by Littelfuse. Power regulator U2 regulates power from power header J1 by reducing the input voltage V down to a voltage suitable for use by microcontroller U1 and the transistors throughout externally controlled circuit 220. Power regulator U2 may, for example, be a LM2936MM-5.0 power regulator manufactured by Texas Instruments. In some embodiments, a 12 Volt battery provides continuous input voltage V to power header J1 and power regulator U2 reduces this to 4.5 Volts to be used by the various components of externally controlled circuit 220. Resistor R6 is arranged between power regulator U2 and power header J1. Specifically, resistor R6 is arranged between power regulator U2 and voltage protection diodes D1 and D2. Resistor R6 may be, for example, a 100 Ω resistor. Capacitor C1 eliminates high frequency noise associated with the regulated power of power regulator U2 (i.e., the 4.5 Volt output). Capacitor C1 may be, for example, a 1 μF 25 V capacitor. Capacitor C2 eliminates high frequency noise associated with power header J1 (i.e., the 12 Volt input). Capacitor C2 may be, for example, a 1 μF 50 V capacitor. Coil header J3 represents one end of solenoid coil 116 and coil header J4 represents the other end of solenoid coil 116. Diode D5 is a TVS diode arranged to suppress voltage spikes that occur when the inductive coil, or solenoid coil 116, is disconnected. Diode D5 may be, for example, a SMLJ51CA diode manufactured by Bourns. Transistor Q1 is the main transistor of externally controlled circuit 220. Transistor Q1 switches solenoid coil 116 on and off. Transistor Q1 may be, for example, an IRFS4615TRLPBF transistor manufactured by Infineon. Resistor R5 is a current limiting resistor arranged between transistor Q1 and microcontroller U1. Resistor R5 may be, for example, a 1Ω resistor. Microcontroller U1 is supplied power (i.e., 4.5 Volts) from power regulator U2. Microcontroller U1 may comprise eight or nine pins. In some embodiments, pin 1 is voltage supply, pins 2 and 3 are input/output pins that can be set to either input for data collection or output for control scheme, pin 4 allows programming memory to be cleared (i.e., if pin 4 is grounded or low it will clear memory, if high it will operate as intended), pin 5 is used as an output, pin 6 is used as a clock input for programming (could also output an internal clock signal), pin 7 is used as an input pin for data coming in from programming header J6 (info is actually sent when programming the chip), pin 8 is the grounding pin, pin 9 is used for mechanical and thermo coupling. It should be appreciated that any suitable microcontroller may be used with any suitable number of pins. For example, microcontroller U1 may be a dual flat no lead (DFN) microcontroller, small outline integrated circuit 8 (SOIC 8) microcontroller, or a quad flat no lead (QFN) microcontroller. Capacitor C3 eliminates high frequency noise associated with the regulated power of power regulator U2 (i.e., the 4.5 Volt output). Capacitor C3 may be, for example, a 0.1 μF capacitor. Capacitor C4 eliminates high frequency noise. Diode D4 is a diode clamp or clamping circuit. Capacitor C4 may be, for example, a 3,900 pF 50 V capacitor. Diode D4 supplies extra voltage if a signal comes in below 0 Volts, and leads off voltage if a signal comes in above 4.5 Volts. Diode D4 may be, for example, a TBAT54S diode manufactured by Toshiba Semiconductor and Storage. Resistor R4 is a pullup resistor to ensure that pin 4 stays high. In other words, resistor R4 ensures that pin 4 remains at the high voltage level (4.5 Volts) instead of the low voltage state or ground level (0 Volts). Resistor R4 may be, for example, a 10Ω resistor. Programming header J6 is the programming header used to actually transmit code into microcontroller U1. Programming header J6 may be used to program solenoid coil 116 on/off time intervals in case of external signal source failure, as is described in U.S. Pat. No. 9,500,190 (Moreira-Espinoza), which reference is herein incorporated by reference in its entirety. Resistor R3 is a pulldown resistor to ensure that pin 2 stays low. In other words, resistor R3 ensures that pin 2 remains at the low voltage level or ground level (0 Volts) when no signal is occurring instead of the high voltage level (4.5 Volts). Resistor R3 may be, for example, a 3Ω resistor. Resistor R2 is a current limiting resistor arranged between microcontroller U1 and transistor Q2. Resistor R2 may be, for example, a 12.7Ω resistor. Transistor Q2 is arranged as a switch when voltage comes in on signal header J5. Transistor Q2 receives a signal S from signal header J5, and then provides a signal to microcontroller U1 to energize the solenoid coil 116. Transistor Q2 receives a signal S from signal header J5, and then provides a signal to microcontroller U1 to de-energize the solenoid coil 116. Transistor Q2 may be, for example, a BSS138 transistor manufactured by ON Semiconductor. Resistor R7 is a current limiting resistor arranged between signal header J5 and transistor Q2. Resistor R7 may be, for example, a 47Ω resistor. Diode D3 provides reverse polarity protection to ensure that nothing will happen if a negative voltage is applied to the signal header J5. Diode D3 may be, for example, a 1N5819 diode manufactured by ON Semiconductor. Resistor R1 and transistor Q3 are used for diagnostic purposes. Namely, resistor R1 and transistor Q3 are used to determine whether electronic control module pump 100 is connected/disconnected. Resistor R1 may be, for example, a 1Ω resistor. Transistor Q3 may be, for example, a BSS138 transistor manufactured by ON Semiconductor.

Microcontroller U1 operates two fold: first, microcontroller U1 generally acts as a switch to energize/de-energize solenoid coil 116. Generally, microcontroller U1 receives a signal from transistor Q2 and relays a signal to transistor Q1 to energize/de-energize solenoid coil 116. Second, microcontroller U1 acts as a pump regulator. If the signal from transistor Q2 goes high for too long (i.e., a continuous high voltage is provided for a prolonged period of time), microcontroller U1 will revert to standard timing as that described in Moreira-Espinoza. As long as the signal line is connected to a voltage input, electronic control module pump 100 can be operated like any other pump. This design and the programming of microcontroller U1 prevents the user from holding solenoid coil 116 on and creating a high current situation. This programming is software controlled by programming header J6.

In some embodiments, an external signal source sends a signal S1 to externally controlled circuit 220 via signal input line 222B (signal header J5). Signal S1 causes transistor Q2 to switch on, thereby completing a circuit and energizing solenoid coil 116. External signal source subsequently sends signal S2 to externally controlled circuit 220 via signal input line 222B (signal header J5). Signal S2 causes transistor Q2 to switch off, thereby breaking the circuit and de-energizing solenoid coil 116. The functionality of externally controlled circuit 220, namely energizing and de-energizing solenoid coil 116, is dependent on the signals sent by the external signal source.

In some embodiments, an external signal source sends a signal S1 to externally controlled circuit 220 via signal input line 222B (signal header J5). Signal S1 causes transistor Q2 to switch on, thereby completing a circuit and energizing solenoid coil 116. If external signal source subsequently malfunctions and fails to send signal S2 to externally controlled circuit 220 via signal input line 222B (signal header J5), solenoid coil 116 remains energized because transistor Q2 has not received an external signal to switch off. However, externally controlled circuit 220 comprises a backup timing scheme programmed in microcontroller U1. Once solenoid coil 116 is energized for a period of time equal to or greater than a predetermined period of time, microcontroller U1 sends a signal to transistor Q1 to switch off. At this point transistor Q1 switches off thereby breaking the circuit and de-energizing solenoid coil. Microcontroller U1 is programmable such that any predetermined time period suitable on a pump by pump basis may be used. Therefore, because transistor Q2 remains switched on due to the faulty external signal source (i.e., failed to provide a signal to switch transistor Q2 off), microcontroller U1 is preprogrammed to energize solenoid coil 116 for a particular time period $T_{on}$, and de-energizes solenoid coil 116 for a particular time period $T_{off}$, for example, while power is generated to operate solenoid coil 116. This means that during each cycle of operation, plunger 110 is biased in direction A1 by electromagnetic force for time period $T_{on}$, and then biased in direction A2 by spring 114 for time period $T_{off}$. The reciprocal motion causes fluid to flow through inlet port 102 and one-way check valve 150 into chamber 156, through suction valve assembly 138 into chamber 158, and through outlet port 106, thereby creating a continuous flow of fluid.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

100 Electronic control module pump
102 Housing
102A Main housing
102B Inlet housing
102C Outlet housing
104 Inlet port
106 Outlet port
108 Bore
110 Plunger
112 Bore
114 Spring
116 Solenoid coil
118 Control unit
120 End
122 End
124 Compressed coils
126 Longitudinal axis
128 Sleeve
130A Seal
130B Seal
132 Bumper spring
134 End
136 Shoulder
138 Suction valve assembly
140 End
142 Cap
144 Seat
146 Stem
148 Retainer element
150 One-way check valve
152 Sealing element
154 Valve housing
156 Chamber
158 Chamber
D1 Diameter
D2 Diameter
L1 Length
L2 Length
A1 Direction
A2 Direction
R Direction
F1 Flow lines
F2 Flow lines
F3 Flow lines
220 Externally controlled circuit
222A Power input line
222B Signal input line
222C Ground line
J1 Power header
J2 Ground header J3 Coil header
J4 Coil header
J5 Signal header
J6 Programming header
D1 Diode
D2 Diode
D3 Diode
D4 Diode
D5 Diode
R1 Resistor
R2 Resistor
R3 Resistor
R4 Resistor
R5 Resistor
R6 Resistor
R7 Resistor
C1 Capacitor
C2 Capacitor
C3 Capacitor
C4 Capacitor
U1 Microcontroller
U2 Power regulator
Q1 Transistor
Q2 Transistor
Q3 Transistor
S Signal
S1 Signal
S2 Signal
V Input voltage

What is claimed is:

1. A control unit for a solenoid fuel pump, the solenoid fuel pump including an inlet port, an outlet port, and a first through-bore connecting the inlet and outlet ports, a plunger disposed within the first through-bore and including a second through-bore, a spring arranged to urge the plunger toward the outlet port, a solenoid coil disposed about a portion of the plunger and arranged to displace the plunger toward the inlet port in response to direct current coil power applied to the solenoid coil, the control unit comprising:
a microcontroller operatively arranged to control the solenoid coil;
a first transistor, arranged between the microcontroller and the solenoid coil, the first transistor operatively arranged to energize and de-energize the solenoid coil in response to the microcontroller; and,
a second transistor connected to the microcontroller, the second transistor being electrically connectable to a signal source that is external to the control unit and the solenoid fuel pump;
wherein:
the signal source communicates with the second transistor to energize and de-energize the solenoid coil; and,
in case of a failure of the signal source, the microcontroller communicates with the first transistor to energize and de-energize the solenoid coil.

2. The control unit as recited in claim 1, wherein the signal source is arranged to:
send a first signal to switch on the second transistor and energize the solenoid coil; and,
send a second signal to switch off the second transistor and de-energize the solenoid coil.

3. The control unit as recited in claim 1, wherein the microcontroller is programmed to:
switch off the first transistor after the solenoid coil has been energized for a first predetermined time period; and,
switch on the first transistor after the solenoid coil has been de-energized for a second predetermined time period.

4. The control unit as recited in claim 3, wherein the microcontroller is arranged to be preprogramed with the first predetermined time period and the second predetermined time period.

5. The control unit as recited in claim 1, further comprising a programming header connected to the microcontroller.

6. The control unit as recited in claim 1, further comprising a power regulator.

7. The control unit as recited in claim 1, further comprising a third transistor electrically connected between a signal header and the second transistor.

8. A solenoid fuel pump, including:
an inlet port, an outlet port, and a first through-bore connecting the inlet and outlet ports;
a plunger disposed within the first through-bore and including a second through-bore;
a spring arranged to urge the plunger toward the outlet port;
a solenoid coil disposed about a portion of the plunger and arranged to displace the plunger toward the inlet port in response to direct current coil power applied to the solenoid coil; and,
a control unit including:
a power header electrically connected to the solenoid coil;
a first transistor electrically connected to the solenoid coil;
a programmable microcontroller electrically connected to the first transistor;
a second transistor connected in series between the microcontroller and the power header; and,
signal source arranged external to the control unit and the solenoid fuel pump and electrically connected to the second transistor;
wherein the second transistor communicates with the signal source to energize and de-energize the solenoid coil.

9. The control unit as recited in claim 8, wherein the signal source is arranged to:
send a first signal to switch on the second transistor and energize the solenoid coil; and,
send a second signal to switch off the second transistor and de-energize the solenoid coil.

10. The control unit as recited in claim 8, wherein the microcontroller is programmed to:
switch off the first transistor after the solenoid coil has been energized for a first predetermined time period; and,
switch on the first transistor after the solenoid coil has been de-energized for a second predetermined time period.

11. The control unit as recited in claim 10, wherein the microcontroller is arranged to be preprogramed with the first predetermined time period and the second predetermined time period.

12. The control unit as recited in claim 8, further comprising a programming header connected to the microcontroller.

13. The control unit as recited in claim 8, further comprising a power regulator.

14. The control unit as recited in claim 8, further comprising a third transistor electrically connected between a signal header and the second transistor.

15. A control unit for a solenoid fuel pump, the solenoid fuel pump including: an inlet port, an outlet port, and a first through-bore connecting the inlet and outlet ports; a plunger disposed within the first through-bore and including a second through-bore; a spring arranged to urge the plunger toward the outlet port; a solenoid coil disposed about a portion of the plunger and arranged to displace the plunger toward the inlet port in response to direct current coil power applied to the solenoid coil, the control unit comprising:

a power header electrically connected to the solenoid coil;
a first transistor electrically connected to the solenoid coil;
a microcontroller electrically connected to the first transistor;
a second transistor electrically arranged between the microcontroller and the power header; and,
an signal source arranged external to the control unit and the solenoid fuel pump and electrically connected to the second transistor;
wherein:
the signal source communicates with the second transistor to energize and de-energize the solenoid coil; and,
in case of a failure of the signal source, the microcontroller communicates with the first transistor to energize and de-energize the solenoid coil.

16. The control unit as recited in claim 15, wherein the signal source is arranged to:
send a first signal to switch on the second transistor and energize the solenoid coil; and,
send a second signal to switch off the second transistor and de-energize the solenoid coil.

17. The control unit as recited in claim 15, wherein the microcontroller is programmed to:
switch off the first transistor after the solenoid coil has been energized for a first predetermined time period; and,
switch on the first transistor after the solenoid coil has been de-energized for a second predetermined time period.

18. The control unit as recited in claim 17, wherein the microcontroller is arranged to be preprogramed with the first predetermined time period and the second predetermined time period.

19. The control unit as recited in claim 15, further comprising a programming header connected to the microcontroller.

20. The control unit as recited in claim 15, further comprising a third transistor electrically connected to a point between a signal header and the second transistor.

* * * * *

UNITED STATES PATENT AND TRADEMARK OFFICE
CERTIFICATE OF CORRECTION

PATENT NO. : 11,255,318 B2
APPLICATION NO. : 16/140828
DATED : February 22, 2022
INVENTOR(S) : Gibson et al.

Page 1 of 1

It is certified that error appears in the above-identified patent and that said Letters Patent is hereby corrected as shown below:

In the Claims

Column 12, Line 36 should read:
"a signal source arranged external to the control unit and"

Column 13, Line 16 should read:
"a signal source arranged external to the control unit and"

Signed and Sealed this
Twelfth Day of April, 2022

Drew Hirshfeld
*Performing the Functions and Duties of the
Under Secretary of Commerce for Intellectual Property and
Director of the United States Patent and Trademark Office*